United States Patent Office 3,149,496
Patented Sept. 22, 1964

3,149,496
CAM MECHANISMS
George Ronald Shepherd and Reginald Philip Burnham, London, England, assignors, by mesne assignments, to Diamond H. Controls Limited, London, England
Filed Aug. 16, 1962, Ser. No. 217,396
Claims priority, application Great Britain Oct. 10, 1961
2 Claims. (Cl. 74—54)

This invention relates to cam mechanisms and more especially to a cam mechanism comprising an operating spindle, a base supporting the spindle for rotation, a driving dog attached to the spindle, a cam follower engaged by the dog while being free for at least limited movement in the direction of the axis of the spindle and a base member having a sloping annular surface formed on one side thereof for engagement by the cam follower to produce a raising and lowering action thereof with relative rotation of spindle and base.

Conveniently part of the cam is supported on a flat annular surface on the base member and a diametrically opposite part is supplied in the sloping annular surface so that a tilting of the cam follower occurs with the relative rotation.

The invention will be further described with reference to the accompanying drawings.

Figure 1:
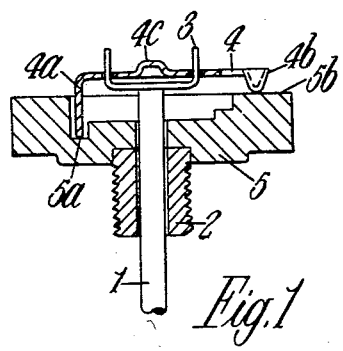
FIG. 1 is a section through the axis of a device according to the invention.
Figure 2:
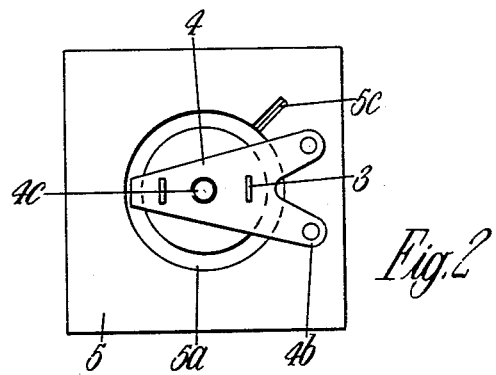
FIG. 2 is a plan view of the device of FIG. 1.

In the drawings, the spindle 1 is supported in an externally threaded bearing 2 and is provided with a driving dog 3 in the form of a U-shaped member with the base of the U held on the spindle.

The ends of the dog 3 are engaged, on each side of the spindle, in slots in a cam follower 4 which is a triangular shape with turned down ends 4a, 4b. The apex turned down end 4a constitutes the actual cam following portion. The other ends 4b are tracking ends and are cup shaped.

In the centre of cam follower 4 is a boss 4c from which the cam following movement is taken, for switch operating purposes.

The end 4a follows an annular sloping track 5a in a base member 5 while the ends 4b follow an annular flat surface 5b of the base member 5 surrounding the annular sloping track.

At one point on surface 5b is provided a radial groove 5c which is used for indexing and locating the ends 4b in certain positions.

In operation as the spindle 1 is turned, the cam follower 4 rises and falls according to the slope of the cam track 5a and the motion is transmitted by the boss 4c to some switch not shown which would generally be spring loaded to press against the boss.

Figure 3:
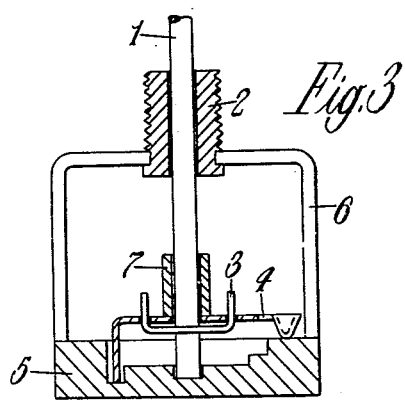
FIG. 3 is a section through the axis of a modification.

In FIG. 3 the bearing 2, instead of being supported directly in the front of base 5, is supported on the back of the base by a bracket 6. The spindle 1 is thus wholly at the back of base 5 and does not pass through it, its end being located in a recess in base 5.

The boss 4c is replaced by a hole through which the spindle 1 passes and the rise and fall of the cam follower 4 is transmitted to the switch by a sleeve 7 around the spindle 1 and resting on the cam follower 4.

Various modifications may be made in accordance with the invention. Thus bearing 2 and base member 5 may be integrally formed and part 4a may be a screw projecting through a threaded aperture in the cam follower and locked by a nut.

The cam follower may in its rotation undertake some auxiliary switch operation and may be of another shape such as circular.

We claim:

1. In a cam mechanism comprising an operating spindle, a base supporting the spindle for rotation, entrainment means attached to the spindle, a cam follower engaged by the entrainment means while being free for at least limited movement in the direction of the axis of the spindle and a base member having a sloping annular surface formed on one side thereof for engagement by the cam follower the improvement which consists of switch operating means provided on the cam follower in the region of the axis of the spindle and operated in the direction of the axis of the spindle with relative rotation between the spindle and base, the cam follower being of generally triangular shape two corners of which are supported in spaced positions on a flat annular surface on the base member and the third corner of which is supported on the sloping annular surface so that a tilting of the cam follower occurs with the relative rotation.

2. The improvement as claimed in claim 1 in which a radial groove is provided on the flat annular surface for indexing of the cam follower position by engagement of one or other of said two corners.

References Cited in the file of this patent
UNITED STATES PATENTS

| 2,172,397 | Meuer | Sept. 12, 1939 |
| 2,602,126 | Morrison | July 1, 1952 |
| 2,625,629 | Coldwell | Jan. 13, 1953 |